United States Patent

Guicherd

[11] 3,876,880
[45] Apr. 8, 1975

[54] PYRANOMETER FOR THE MEASUREMENT OF SOLAR RADIATION

[75] Inventor: Roger Guicherd, St-Egreve, France

[73] Assignee: Commissariat a l'Energie Atomique, Paris, France

[22] Filed: Mar. 13, 1974

[21] Appl. No.: 450,757

[30] Foreign Application Priority Data
Mar. 20, 1973 France.............................. 73.09938

[52] U.S. Cl................ 250/349; 73/355 R; 250/338; 250/352; 250/510
[51] Int. Cl.............................................. G01j 1/02
[58] Field of Search .......... 250/338, 349, 352, 510; 73/335 R

[56] References Cited
UNITED STATES PATENTS
2,768,527  10/1956  Stern et al. ..................... 250/338 X
3,390,576  7/1968   Yellott......................... 73/355 R X
3,413,477  11/1968  Fischer et al. ................. 250/510 X
3,708,667  1/1973   Denis et al......................... 250/338

Primary Examiner—Archie R. Borchelt
Attorney, Agent, or Firm—Lane, Aitken, Dunner & Ziems

[57] ABSTRACT

The pyranometer for the measurement of total solar radiation is of the filtering hemisphere type incorporating a thermoelectric detector and comprises at least three measuring heads of the thermoelectric detector type each having a number of stationary hemispherical filters including at least one selective filter which are superposed in concentric relation and through which the radiation to be measured passes continuously, circulation systems for internal ventilation between the filters of each measuring head in order to remove the heat produced by absorption of radiation by the filters, a heat removal system which is common to the internal ventilation systems, an external system for continuous ventilation of the measuring heads.

10 Claims, 2 Drawing Figures

PYRANOMETER FOR THE MEASUREMENT OF SOLAR RADIATION

This invention relates to a pyranometer which serves to measure the total radiation of the solar spectrum and has an internal cooling system which is intended to provide compensation for drift of filters.

It is known that extraterrestrial solar energy E (solar constant) is equivalent to 0.14 W/cm² with the following composition : ultraviolet radiation (UV) 8 %, visible radiation (V) 41 %, infrared radiation (IR) 51 %. In the case of a zenithal sun in plains and under the most favorable conditions, that is to say with an atmospheric mass equal to 1, there is obtained a total radiation Tr of 0.10 W/cm² with the following proportions : $UV = 1$ to 2 %, $V = 42$ % and $IR = 56$ to 57 %. In the same latitudes as France and in a clear sky, the mean solar energy is usually 0.07 W/cm².

The direct radiation (Dr) emanating from the solar disc is known and recorded in respect of all astronomical variations as a function of locations, days and hours and so forth. The total radiation (Tr) is much less known as a result of variations arising from natural and artificial atmospheric phenomena (pollution).

The known instruments which are employed for measuring total radiation (Tr) are usually laboratory instruments with removable filters for instantaneous measurement of radiation in the ultraviolet, visible and infrared regions. These instruments are in fact thermal detectors based on the principle of absorption of black bodies and are highly stable and linear. However, thermal instruments suffer from a disadvantage in that they are sensitive to the entire spectrum including the long wavelengths which generate heat and cause temperature variations as well as to extraneous heat (absorption) other than the heat generated by the energy to be measured. The removal of said heat gives rise to problems of constructional design which govern the quality and precision of the measurement performed by the instrument.

The present invention relates to a pyranometer for the measurement of fluctuations of the solar spectrum which overcomes the disadvantages mentioned in the foregoing by permitting continuous wavelength-selective measurement from sunrise to sunset.

To this end, the pyranometer under consideration is characterized in that it comprises :

at least three measuring heads of the thermoelectric detector type and each comprising a number of stationary hemispherical filters including at least one selective filter which are superposed in a concentric manner and through which the radiation to be measured passes continuously, circulation systems for internal ventilation between the filters of each head for the purpose of removing the heat produced by absorption of radiation by said filters, a heat removal system which is common to the internal ventilation systems, an external system for continuous ventilation of the measuring heads.

In accordance with one important feature of the invention, one external hemispherical filter of each measuring head is a selective filter assigned to a portion of the total radiation, namely within the respective ranges of ultraviolet radiation (0.2 to 0.4 $\mu$), of visible radiation (0.4 to 0.7 $\mu$) and of infrared radiation (0.7 to 3.4 $\mu$).

In accordance with another advantageous feature, at least one internal hemispherical filter of each measuring head is a transparent filter within the range of 0.2 to 3.4 $\mu$ of wavelength.

In one advantageous embodiment of the invention, the hemispherical filters are concentric domes which are bonded to the support of the thermoelectric detector at the point of largest diameter of each dome, a space formed between said domes being in communication with nozzles which are connected to the internal ventilation system.

In order to permit removal of heat from the interior of the measuring heads, steps are taken to ensure on the one hand that the two faces of the thermocouple respectively on the side nearest the filters and on the side nearest the connections communicate through ducts with the internal ventilation system and on the other hand that the internal heat-removal system associates the ventilation systems either in cascade or in series.

The internal ventilation systems and the heat removal system carry a circulation of a dry gas which is preferably air but can also belong to the group consisting of nitrogen and argon.

The following description relates to examples of construction which are described with reference to the accompanying drawings, wherein.

Figure 1:
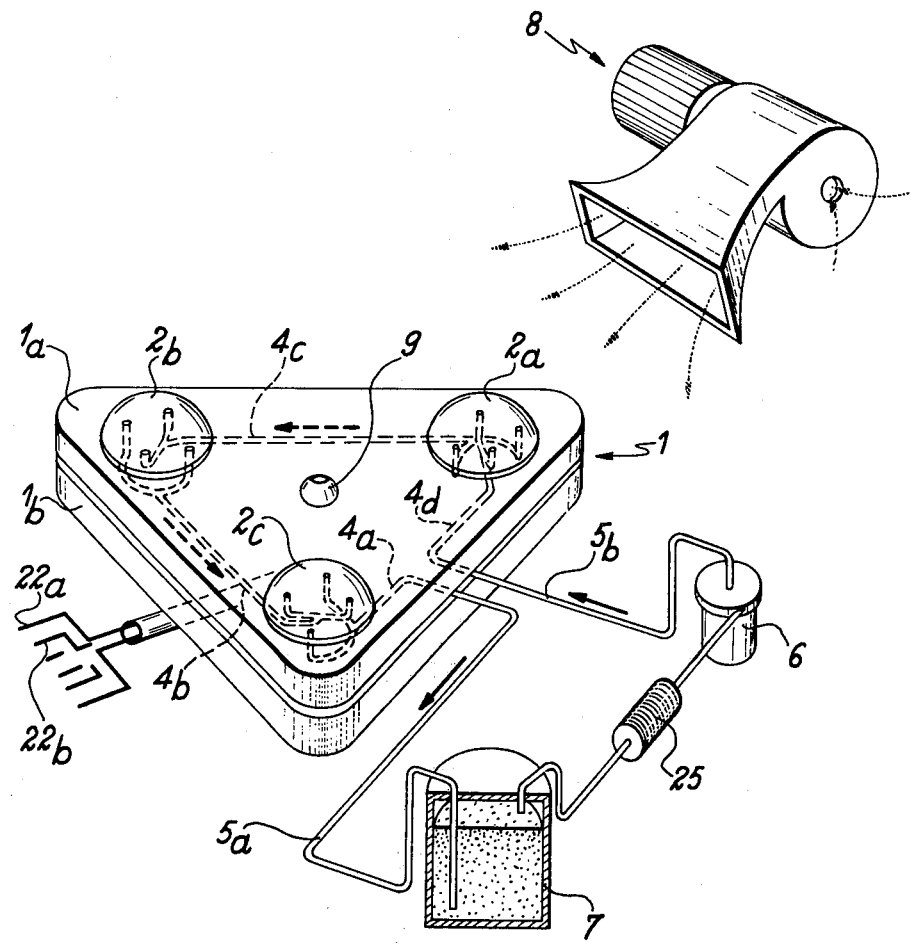
FIG. 1 is a general diagram of the pyranometer in accordance with the invention.
Figure 2:
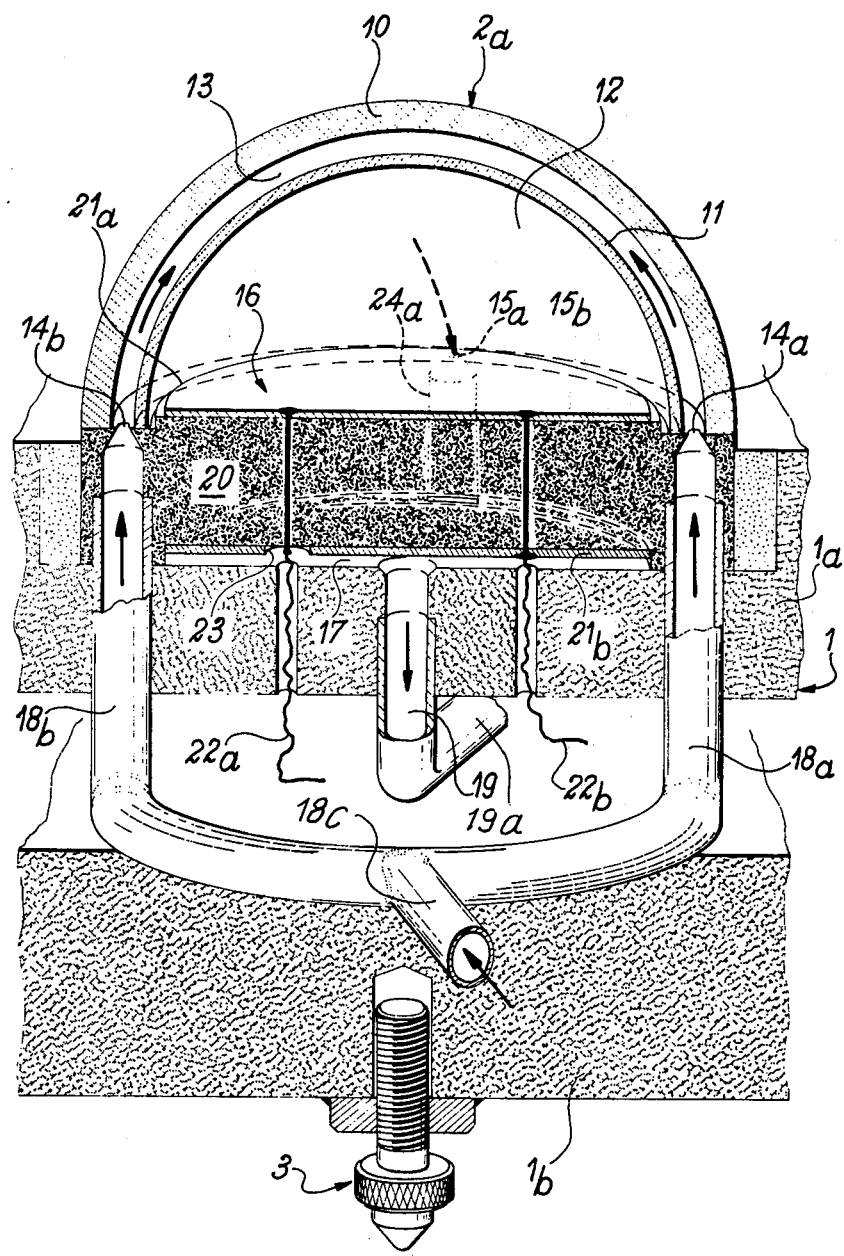
FIG. 2 is a sectional view of one measuring head of the pyranometer.

The pyranometer as shown in FIGS. 1 and 2 has a base 1 (two components 1a and 1b) surmounted by three measuring heads 2a, 2b, 2c. The base 1 is preferably made of marble and levelled by means of adjusting screws such as the screws 3a, 3b, 3c and a water level 9.

The measuring heads 2a to 2c are each specialized respectively for the detection of radiation over a range which passes through the ultraviolet region (0.2 to 0.4 $\mu$), the visible region (0.4 to 0.7 $\mu$) and the infrared region (0.7 to 3.4 $\mu$). Apart from the sensitivity of the measuring elements and the type of filters employed, the mechanical characteristics of the measuring heads are identical.

In the example shown in FIG. 2, a measuring head of the type designated by the reference 2a consists of two concentric filtering hemispheres 10 and 11 which are bonded to the support 20 of a transducer 16 at the periphery which corresponds to their largest diameter, said support 20 being in turn bonded to the base 1. The space 12 formed between the hemisphere 11 and the corresponding face of the transducer 16 is hermetically sealed and put under a pressure of 1,000 millibars.

A space 13 formed between the hemispheres 10 and 11 communicates with a heat removal system described in detail hereinafter by means of nozzles 14a, 14b and 15a, 15b which are relatively displaced along the mean circumference of the space 13. The nozzles 14a, 14b are joined to the ducts 18a, 18b which terminate in a common branch-pipe 18c. The nozzles 15a, 15b communicate through ducts such as the duct 24a with a chamber 17 which is placed beneath the transducer 16 and is in turn connected to a central duct 19 fitted with a branch pipe 19a.

The external hemispheres of the measuring heads are cooled by means of an external blower 8.

In order to remove the heat absorbed by the measuring heads, provision is made in accordance with the invention either for an internal heat removal system in cascade which consists in connecting the internal ventilation systems 13, 14a, 14b, 18a, 18b and 13, 24a, 17, 19 of the measuring heads 2a to 2c in series (as shown in FIG. 1) or in connecting these latter in parallel (not shown).

In the example of FIG. 1 in which a heat removal system is connected in cascade, the base 1 is provided with internal pipes 4a to 4d which are joined to the branch-pipes 18c, 19a and connected to a suction pump 6 by means of pipes 5a and 5b. The suction pump is connected to a heat exchanger 25 and to a dryer 7 so as to permit the circulation of a cooling fluid such as a dry gas which is preferably air but may alternatively be either nitrogen or argon. Connection of the branch-pipes 18c, 19a (as shown in FIG. 2) to the respective internal pipes 4a to 4d is reversed from one measuring head to the next in order to remove the maximum amount of heat from the measuring head 2a which is reserved for the measurement of ultraviolet radiation.

The pressure of the dry-gas stream which circulates within the space 13 between the hemispheres 10 and 11 is negligible with respect to the pressure of 1,000 mb which prevails within the space 12.

In the example under consideration, the hemisphere 10 is a selective filter of black appearance and tinted right through by absorbent colored ions. Depending on the selection adopted for the measuring head, the hemisphere 10 is tinted to a greater or lesser extent in order to absorb either visible and infrared radiation or visible and ultraviolet radiation; said hemisphere has a practically transparent appearance in order to absorb infrared and ultraviolet radiation simultaneously. The filtering capacity of the measuring heads permits a range of 0.2 to 0.4 $\mu$ in the ultraviolet, of 0.4 to 0.7 $\mu$ in the visible region, and 0.7 to 3.4 $\mu$ in the infrared.

The transducer 16 is formed of an inserted plate 20 of epoxy resin which is covered by sensitive surfaces 21a and 21b. By way of example, the composition of said surfaces in the order of superposition is as follows : a layer of tin-nickel alloy (on the insulating plate 20), a layer of copper, a layer of epoxy resin, a layer of absorbent black. It would also be possible to employ a layer of gold-base alloy.

The sensitive surfaces 21a and 21b are connected electrically in series by means of iron-constantan conductors 22a, 22b which pass through the plate 20. A hole 23 which is larger than the diameter of the conductor 22 is formed in the surface 21b in order that the series connection may be carried out.

The conductors 22a, 22b are extended through the base 1 so as to be brought out to the exterior and connected to a measuring instrument such as a recorder (not shown in the figures).

The general operation of the pyranometer in accordance with the invention is as follows : the total solar radiation Tr is applied to all three measuring heads 2a, 2b and 2c. In order to satisfy criteria of measurement of the total radiation spectrum, the filters 10 have respective coefficients which are suitable for selection of ultraviolet radiation, visible radiation and infrared radiation.

The greater the selection, the more the radiation stopped by the filter is converted into heat energy.

The energy emanating from the sun heats the selective filters 10 which transmit wavelengths longer than those which are intended to be measured and which will in turn be absorbed by the filters 11, with the result that said filters will become heated. Thus, in order to measure only 2 % of ultraviolet radiation, 98 % of the total radiation must be eliminated within the spectrum.

The absorption of excess heat is carried out by internal circulation and discharge of dry gas from the pump 6 (shown in FIG. 2). The gas introduced into the space 13 between the two hemispheres 10 and 11 absorbs the heat and this latter is removed to the exterior in cascade or in parallel through the internal pipes such as those designated by the references 4a and 5a. A heat exchanger 25 ensures dissipation of heat in the surrounding air.

The measurement performed by a measuring head such as the head 2a takes place as follows : the hemisphere 10 which acts as a selective filter is traversed by that portion of the spectrum which corresponds to the ultraviolet region, to the visible region or to the infrared region. The coefficient of selection of a hemisphere such as 10 is determined by the filtering material employed in the fabrication of this latter.

For the purpose of measuring infrared or visible radiation, approximately 40 % of the radiation passes through the hemisphere 10, taking into account a loss which arises from the inherent coefficients of reflection and absorption of the filter. Part of the ultraviolet radiation and of the infrared radiation is reflected whilst the remainder is absorbed by the filter.

For the purpose of measuring the ultraviolet radiation, only 2 % of the total radiation passes through the hemisphere 10 as mentioned earlier. The infrared and the visible radiation are eliminated by reflection and absorption. The filter is therefore subjected to high thermal activity and for this reason the corresponding hemisphere 10 is ventilated externally and selectively by the blower 8.

That portion of the total radiation which is permitted to pass through the hemisphere 10 then passes through the second hemisphere 11 which behaves as a transparent filter for all wavelengths within the range of 0.2 to 3.4 $\mu$. The filtered portion of the radiation (infrared, visible or ultraviolet) is then applied to the surface of the transducer 16 (thermoelectric detector) and detected in the form of electromotive force.

The electromotive force delivered by the thermoelectric detectors 16 is of the order of 124 $\mu$V per mw/cm$^2$ of energy detected at the surface. It is apparent that, without the compensation provided by the internal circulation of gas, the excess energy passing through the filters which have become less selective would impair the accuracy of measurement.

As mentioned earlier, the mean solar energy before the filters was approximately 0.07 W/cm$^2$ in the same latitudes as in France with a clear sky.

The energies applied to the thermal detectors (transducers 16) which are employed in the present example after the filters (hemispheres 10 and 11) are as follows :

| Energy | UV = 0.50 mw/cm$^2$ |
| Energy | V = 22 mw/cm$^2$ |
| Energy | IR = 34.5 mw/cm$^2$ |

These energies produce electromotive forces at the output of the thermoelectric detectors which attain the orders of magnitude mentioned below by way of indication :

| | | |
|---|---|---|
| E.m.f. | UV = 62 μV = | 0.062 mV |
| E.m.f. | V = 2728 μV = | 2.728 mV |
| E.m.f. | IR = 4276 μV = | 4.276 mV. |

What we claim is :

1. A pyranometer for the measurement of total solar radiation of the filtering hemisphere type incorporating a thermoelectric detector, wherein said pyranometer comprises :
   at least three measuring heads of the thermoelectric detector type and each comprising a number of stationary hemispherical filters including at least one selective filter which are superposed in a concentric manner and through which the radiation to be measured passes continuously,
   circulation systems for internal ventilation between the filters of each head for the purpose of removing the heat produced by absorption of radiation by said filters,
   a heat removal system which is common to the internal ventilation systems,
   an external system for continuous ventilation of the measuring heads.

2. A pyranometer according to claim 1, wherein one external hemispherical filter of each measuring head is a selective filter assigned to a portion of the total radiation, namely within the respective ranges of ultraviolet radiation (0.2 to 0.4 μ), of visible radiation (0.4 to 0.7 μ) and of infrared radiation (0.7 to 3.4 μ).

3. A pyranometer according to claim 1, wherein at least one internal hemispherical filter of each measuring head is a transparent filter within the range of 0.2 to 3.4 μ of wavelength.

4. A pyranometer according to claim 1, wherein the hemispherical filters are concentric domes which are bonded to the support of the thermoelectric detector at the point of largest diameter of each dome, a space formed between said domes being in communication with nozzles which are connected to the internal ventilation system.

5. A pyranometer according to claim 1, wherein the two faces of the thermocouple respectively on the side nearest the filters and on the side nearest the connections communicate through ducts with the internal ventilation system.

6. A pyranometer according to claim 1, wherein the internal heat removal system associates the ventilation systems in cascade.

7. A pyranometer according to claim 1, wherein the internal heat removal system associates the ventilation systems in parallel.

8. A pyranometer according to claim 1, wherein the internal ventilation systems and the heat removal system carry a circulation of dry gas.

9. A pyranometer according to claim 8, wherein the dry gas is air.

10. A pyranometer according to claim 8, wherein the dry gas belongs to the group consisting of nitrogen and argon.

* * * * *